S. W. TRUE.
CONVEYER SYSTEM.
APPLICATION FILED MAY 12, 1919.
1,369,502.
Patented Feb. 22, 1921.
2 SHEETS—SHEET 1.
Fig. 1
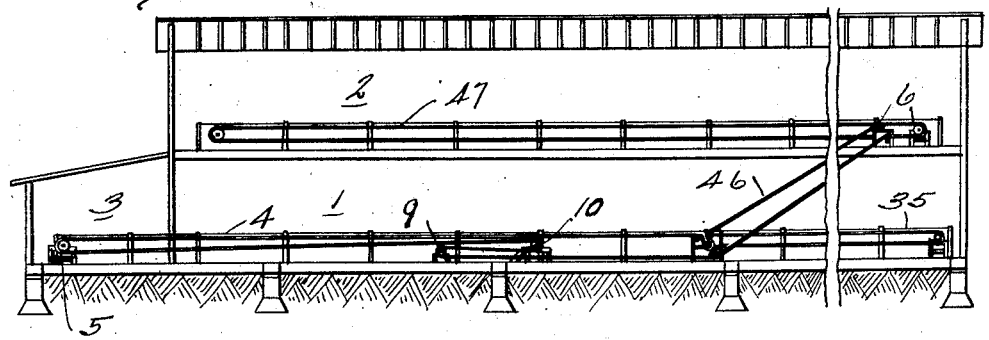
Fig. 2
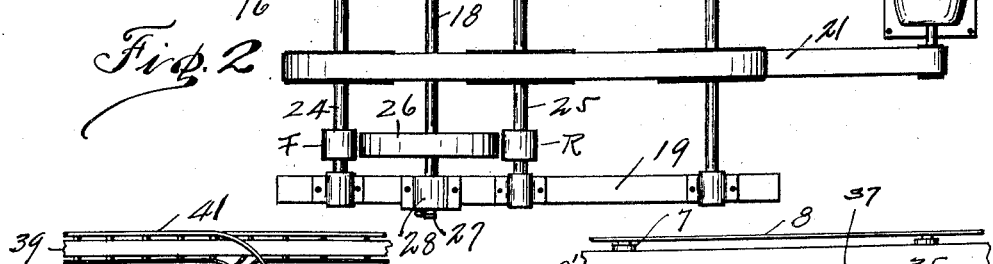
Fig. 6
Fig. 7
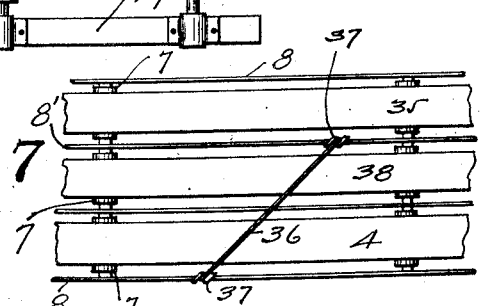
Fig. 8
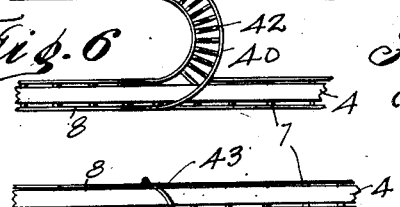
Inventor
Sylvester W. True
By Herbert E. Smith
Attorney S. W. TRUE.
CONVEYER SYSTEM.
APPLICATION FILED MAY 12, 1919.
1,369,502.
Patented Feb. 22, 1921.
2 SHEETS—SHEET 2.
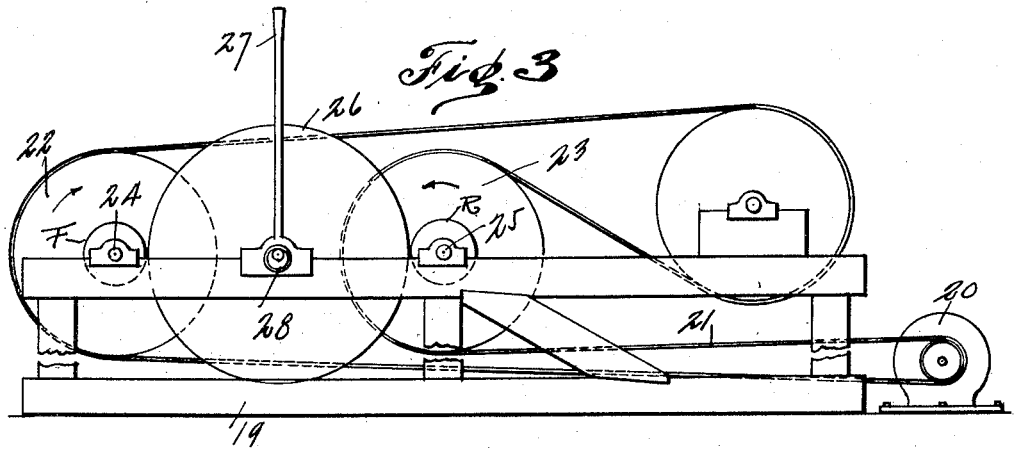
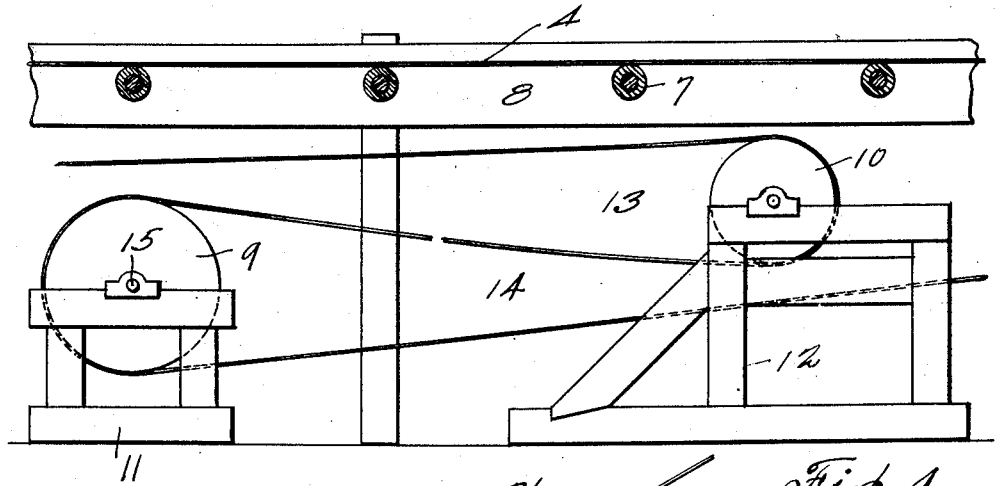
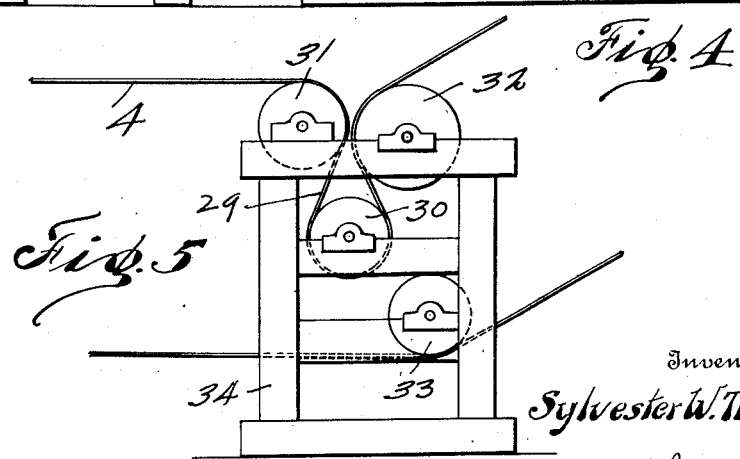
Inventor
Sylvester W. True
By Herbert E. Smith
Attorney

UNITED STATES PATENT OFFICE.

SYLVESTER W. TRUE, OF HILLYARD, WASHINGTON, ASSIGNOR OF ONE-HALF TO WASHINGTON MACHINERY AND SUPPLY COMPANY, OF SPOKANE, WASHINGTON.

CONVEYER SYSTEM.

1,369,502.   Specification of Letters Patent.   Patented Feb. 22, 1921.

Application filed May 12, 1919. Serial No. 296,436.

*To all whom it may concern:*

Be it known that I, SYLVESTER W. TRUE, a citizen of the United States, residing at Hillyard, in the county of Spokane and State of Washington, have invented certain new and useful Improvements in Conveyer Systems, of which the following is a specification.

The present invention relates to improvements in conveyer systems, and while the invention is especially designed for handling packages or boxes of fruit, it will readily be understood that other articles or material, may be handled or conveyed by the endless conveyer which forms the subject-matter of this invention.

The invention is illustrated herein in connection with a fruit-packing house, and by means of the endless belts and their accessories, the fruit is received from the grower, and is automatically conveyed through the packing house until it is finally disposed of, either in storage or shipment on cars to their allotted destination.

The invention consists essentially in the novel combination and arrangement of the conveyer belts, and in connection therewith, a novel form of friction-driving gear is utilized so that the conveyer may be operated both forwardly and rearwardly for conveying either incoming or outgoing material. The invention also contemplates the use of switches for shifting or shunting a package from a belt traveling in one direction, to a complementary belt traveling in the opposite direction, and other features included in the invention will be hereinafter pointed out and claimed.

In the accompanying drawings one complete example of the physical embodiment of the invention is illustrated, the parts being combined and arranged according to the best mode I have so far devised for the practical application of the principles of the invention.

Figure 1 is a diagrammatic view in elevation showing the conveyer system installed in a two-story packing house of the usual type.

Fig. 2 is an enlarged top plan view of the driving friction gear for the endless belt of the conveyer.

Fig. 3 is a side elevation, enlarged, of the driving friction gear.

Fig. 4 is a fragmentary view of the conveyer belt, showing the driven rollers or pulleys interposed in the lower flight of the belt.

Fig. 5 is a side view showing the junction between the horizontal portion of the belt, and the elevating or inclined portion of the belt.

Fig. 6 is a plan view showing a switch from a belt moving in one direction to a belt moving in the reverse direction.

Fig. 7 is a plan view of a switch for transferring packages from one belt to a third belt traveling in the same direction, there being employed a short intermediate transfer belt between these two carriers.

Fig. 8 is a detail view showing the use of a deflector for guiding the boxes from the conveyer belt to an elevator.

In the preferred embodiment of the invention, as shown in the drawings, I have illustrated a typical fruit-packing house having the first and second stories, and a platform outside the house, these features being indicated by the numerals 1, 2 and 3, respectively.

The endless conveyer belt 4 is supported at 5, out on the platform 3, and the packages of fruit are deposited on the upper flight of the conveyer belt 4 at this point. The other end of the conveyer belt is supported at 6 in the second story of the packing-house, and the upper flight of the belt is supported on regularly spaced rollers 7, in the frame 8.

The packages are carried on the upper flight of the belt 4, and the belt is directly driven through the interposition of a pair of pulleys 9 and 10, which are journaled in the respective frames 11 and 12 that are spaced a suitable distance apart. The pulley 10 is an idle pulley, while the larger pulley 9 is the operating pulley, and in Fig. 4 it will be seen that the lower flight of the belt 4 is formed with two loops 13 and 14 that are passed around these small and larger pulleys. The operating pulley 9 is fixed on the operating shaft 15, and this shaft carries a spur gear 16 which is driven by the pinion 17 on a driving shaft 18. The gear, the pinion and the driving shaft are supported in a frame 19 located alongside the belt 4, and these three members form elements of the friction drive gear for the conveyer, which gear is operated from the motor 20.

In Fig. 3, it will be seen that the motor 20, through its looped belt 21, drives two driven wheels 22 and 23, in reverse directions. These wheels are supported in the frame 19, on their shafts 24 and 25, respectively, and the wheels are revolved in the direction of the arrows, as indicated in Fig. 3. The pulley 22 is designed to drive the conveyer belt 4 in the direction of the arrow in Fig. 2, in order to carry the packages of fruit into the packing house, and the pulley 23 is designed to reversely drive the conveyer belt in order to carry packages out of the house.

The two shafts 24 and 25 are provided with small friction pulleys indicated as F and R, and these two pulleys, or rather either of them, is designed to revolve the shaft 18 through the instrumentality of a main friction wheel 26, on the shaft 18, which wheel is interposed between these two small friction driving wheels. The large friction wheel may be moved into position to contact with either of the small friction driving wheels through the manipulation of an eccentric lever 27, which is designed to move an eccentric bearing 28 in which the shaft 18 is journaled, and it will readily be seen that by moving the lever to throw the large friction wheel in contact with the small wheel F, the conveyer belt will be operated to carry the goods or packages into the house, or when the lever is thrown in the opposite direction, the large wheel 26 will contact with the small wheel R, to move the upper flight of the conveyer in the reverse direction, whereby goods may be conveyed out of the storehouse.

The loops 13 and 14, in the lower flight of the belt, which form overlapping portions thereof, which pass around the operating pulley 9 and the idle pulley 10, are approximately one-tenth the length of the belt, and this proportion for the overlapping part of the flight has been found efficient in preventing the belt from slipping, and for securing the necessary friction or grip of the belt on the large wheel 9 for driving the belt.

In Fig. 5 is illustrated the means for changing the belt from a horizontal conveyer to an inclined elevator, and this is accomplished by forming a loop 29 in the upper flight of the belt, which passes around an idle pulley 30, and between the two guide pulleys 31 and 32. An additional pulley 33 is employed for the lower flight of the belt, and these pulleys are all journaled in a suitable framework 34, located at the desired point for changing the plane of movement of the belt.

The primary conveyer belt 4 which has its end converted into an elevator, or inclined plane is adapted to carry packages or boxes to the second floor of the storehouse, but an additional belt 35, of the endless type, is provided to continue the movement of the packages along on the ground or first floor of the house when so desired, and the packages or boxes are transferred or switched from belt 4 to belt 35 through the instrumentality of a switch or guide arm 36, in Fig. 7. This arm is arranged obliquely across the belt 4, in brackets 37 37 forming parts of the frames 8 and 8' for supporting these endless belts, and the guides or switch members are of sufficient strength and of the proper material to withstand the impact of a box being carried on the belt 4. Thus, as the first box (Fig. 7) encounters the guide arm 36 it is shunted obliquely toward the belt 35, traveling in the same direction as the belt 4, and the succession of boxes being brought along by the belt 4 gradually pushes the first box past the end of the oblique guide onto the continuing belt 35, and the boxes, in succession are carried forward on this belt 35. In some instances it may be necessary to interpose an intermediate, transfer belt 38, between the two belts 4 and 35, and it will be understood that all three of these belts are moving in the same direction to convey the boxes. The guide arm or switch arm 36 is portable and may be positioned at any desirable and convenient point for the purpose of transferring boxes from one belt to another belt traveling in the same direction.

In Fig. 6 another feature of the conveyer system is illustrated by means of which a box may be transferred or switched from the belt 4 going in one direction, to a similar endless belt 39 traveling in the opposite direction, and this device may be interposed at suitable places where it is necessary or desirable to reverse the movement or travel of the box or package. The transfer device or switch comprises a circular frame 40 supported between the frame 8 of the endless belt 4, and the frame 41 of the endless belt 39, and between the side bars of the frame are journaled a series of radiating rollers 42. The transfer of the boxes in this instance is similar to that of Fig. 7 in that the boxes passing to the right in Fig. 6 first encounter the curved frame 40 and are diverted onto the rollers 42, and the successive arrival of the boxes eventually forces the first, and then the succeeding boxes, around the switch member over the rollers, onto the return or reverse belt 39.

In Fig. 8 another feature of the system is illustrated wherein the boxes are deflected from the belt 4 by a curved or oblique deflector 43 extending across the belt and located at the base of an inclined elevator frame 44, between the side members of which the rollers 45 are journaled. The same action is involved here as in the devices of Figs. 7 and 6 already described, and the boxes are forced up the inclined elevator, step by step until the uppermost box passes over the top of the elevator, or is otherwise disposed of, and the succeeding boxes follow the first one.

The boxes of fruit are usually received from the orchard at the platform 3 and are passed along the first floor on the conveyer belt 4, and up the incline or elevating part of the belt indicated at 46 which is supported at 6 in the upper story of the packing house. The sorting and packing tables for the fruit are located on the second floor, and the endless conveyer 47, similar to the conveyer belt 4 is utilized to convey the fruit during the process of sorting. The switch indicated in Fig. 6 is utilized at the point 6 in Fig. 1 to transfer the boxes from the conveyer 4 to the conveyer 47 moving in the opposite direction, and the equipment for sorting the fruit is located along the length of this conveyer belt 47. The two switches shown in Figs. 6 and 7 it will readily be seen may be utilized wherever required to transfer or shunt the boxes from one conveyer belt to another during the course of the travel of the fruit, and in loading the fruit on cars for instance the gravity incline or elevator of Fig. 8 is utilized.

At times it becomes necessary to change the direction of travel of the conveyer belts, as for instance the belts travel in one direction for incoming fruit, while the direction of travel is reversed for outgoing fruit, and for this reversal of movement the lever 27 is utilized as described for reversing the movement of the conveyer belts. Some of the details of construction have purposely been omitted from the drawings, but it is believed the essence of the invention will readily be apparent from the illustrations taken in connection with the above description.

What I claim is—

1. In a conveyer system an endless horizontal belt having a pair of overlapping loops in its lower flight and a driven pulley and a guide pulley in said loops, said belt having an upwardly inclined stretch, and means forming a closed loop in the carrier flight of the belt at its junction with the inclined stretch.

2. In a conveyer system an endless horizontal belt having a pair of overlapping loops in its lower flight and a driven pulley and a guide pulley in said loops, said belt having an upwardly inclined stretch, and means comprising a depressed roller and a pair of closely spaced guide rollers forming a closed loop in the carrier flight of the belt at its junction with the inclined stretch.

3. The combination with a supporting frame and complementary brackets thereon, of a pair of spaced carrier belts, an intermediate moving transfer belt, and a portable obliquely disposed deflecting member supported in said brackets extending across one carrier belt and the intermediate belt.

In testimony whereof I affix my signature.

SYLVESTER W. TRUE.